(12) United States Patent
Sanchez

(10) Patent No.: US 12,082,081 B2
(45) Date of Patent: *Sep. 3, 2024

(54) SYSTEMS AND METHODS FOR DETERMINING APPLICATION STATUS

(71) Applicant: BlueOwl, LLC, San Francisco, CA (US)

(72) Inventor: Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,521

(22) Filed: Apr. 14, 2023

(65) Prior Publication Data

US 2023/0254671 A1 Aug. 10, 2023

Related U.S. Application Data

(63) Continuation of application No. 16/913,727, filed on Jun. 26, 2020, now Pat. No. 11,653,186.

(51) Int. Cl.
*H04W 4/38* (2018.01)
*H04W 24/10* (2009.01)

(52) U.S. Cl.
CPC .............. *H04W 4/38* (2018.02); *H04W 24/10* (2013.01)

(58) Field of Classification Search
CPC ................................ H04W 4/38; H04W 24/10
See application file for complete search history.

(56) References Cited

U.S. PATENT DOCUMENTS

| 6,437,688 | B1 | 8/2002 | Kobayashi |
| 6,459,371 | B1 | 10/2002 | Pike |
| 6,868,386 | B1 | 3/2005 | Henderson et al. |
| 7,280,898 | B2 | 10/2007 | Lesesky et al. |

(Continued)

FOREIGN PATENT DOCUMENTS

| GB | 2522728 | 8/2015 |
| JP | 2012126273 | 7/2012 |

(Continued)

OTHER PUBLICATIONS

Clark, Best medical alerts for caregivers, The SeniorList, Retrieved from https://www.theseniorlist.com/medical-alert-systems/best/caregivers/, Mar. 2019, 10 pages.

(Continued)

*Primary Examiner* — Austin J Moreau
(74) *Attorney, Agent, or Firm* — BRYAN CAVE LEIGHTON PAISNER LLP

(57) ABSTRACT

Method and system for determining a status of an application previously installed on a mobile device of a user are disclosed. For example, the method includes determining that an application has been installed on a mobile device of a user, determining whether the sensor data is received from the application at least once during a predetermined time interval, determining that the application does not work properly on the mobile device of the user in response to the sensor data being not received at least once during the predetermined time interval, and transmitting a notification to the mobile device indicating that the application does not work properly.

20 Claims, 5 Drawing Sheets

(56) References Cited

U.S. PATENT DOCUMENTS

| | | |
|---|---|---|
| 7,421,334 B2 | 9/2008 | Dahlgren et al. |
| 8,117,049 B2 | 2/2012 | Berkobin et al. |
| 8,311,858 B2 | 11/2012 | Everett et al. |
| 8,606,512 B1 | 12/2013 | Bogovich |
| 8,731,768 B2 | 5/2014 | Fernandes et al. |
| 8,731,977 B1 | 5/2014 | Hardin et al. |
| 8,799,032 B2 | 8/2014 | Fernandes et al. |
| 8,805,707 B2 | 8/2014 | Schuman et al. |
| 8,862,486 B2 | 10/2014 | Cordova et al. |
| 8,922,393 B2 | 12/2014 | Ricci |
| 8,924,240 B2 | 12/2014 | Depura et al. |
| 8,935,036 B1 | 1/2015 | Christensen et al. |
| 9,014,911 B2 | 4/2015 | Ricci |
| 9,031,545 B1 | 5/2015 | Srey et al. |
| 9,037,394 B2 | 5/2015 | Fernandes et al. |
| 9,043,130 B2 | 5/2015 | Ricci |
| 9,046,374 B2 | 6/2015 | Ricci |
| 9,047,778 B1 | 6/2015 | Cazanas et al. |
| 9,105,051 B2 | 8/2015 | Ricci |
| 9,111,316 B2 | 8/2015 | Fernandes et al. |
| 9,123,058 B2 | 9/2015 | Ricci |
| 9,129,449 B2 | 9/2015 | Davidson |
| 9,159,232 B2 | 10/2015 | Ricci |
| 9,164,957 B2 | 10/2015 | Hassib et al. |
| 9,176,924 B2 | 11/2015 | Ricci |
| 9,240,018 B2 | 1/2016 | Ricci |
| 9,278,689 B1 | 3/2016 | Delp |
| 9,311,271 B2 | 4/2016 | Wright |
| 9,355,423 B1 | 5/2016 | Slusar |
| 9,390,451 B1 | 7/2016 | Slusar |
| 9,398,423 B2 | 7/2016 | Cordova et al. |
| 9,421,864 B1 | 8/2016 | Srey et al. |
| 9,443,270 B1 | 9/2016 | Friedman et al. |
| 9,454,786 B1 | 9/2016 | Srey et al. |
| 9,558,520 B2 | 1/2017 | Peak et al. |
| 9,591,083 B1 * | 3/2017 | Gumbula ............... H04L 43/10 |
| 9,619,203 B2 | 4/2017 | Tamir et al. |
| 9,633,318 B2 | 4/2017 | Plante |
| 9,633,487 B2 | 4/2017 | Wright |
| 9,672,569 B2 | 6/2017 | Fernandes et al. |
| 9,672,571 B2 | 6/2017 | Fernandes et al. |
| 9,679,487 B1 | 6/2017 | Hayward |
| 9,783,159 B1 | 10/2017 | Potter et al. |
| 9,786,154 B1 | 10/2017 | Potter et al. |
| 9,832,241 B1 | 11/2017 | Hayward |
| 9,836,062 B1 | 12/2017 | Hayward |
| 9,836,962 B1 | 12/2017 | Hayward |
| 9,836,963 B1 | 12/2017 | Hayward |
| 9,841,286 B1 | 12/2017 | Hayward |
| 9,841,287 B1 | 12/2017 | Hayward |
| 9,841,767 B1 | 12/2017 | Hayward |
| 9,842,496 B1 | 12/2017 | Hayward |
| 9,904,289 B1 | 2/2018 | Hayward |
| 9,911,159 B1 | 3/2018 | Srey et al. |
| 9,932,033 B2 | 4/2018 | Slusar et al. |
| 9,972,209 B1 | 5/2018 | Hayward |
| 10,007,263 B1 | 6/2018 | Fields |
| 10,008,111 B1 | 6/2018 | Grant |
| 10,012,987 B2 | 7/2018 | Shem et al. |
| 10,023,114 B2 | 7/2018 | Adams et al. |
| 10,032,226 B1 | 7/2018 | Suizzo et al. |
| 10,037,578 B2 | 7/2018 | Bogovich et al. |
| 10,037,579 B2 | 7/2018 | Bogovich et al. |
| 10,037,580 B2 | 7/2018 | Bogovich et al. |
| 10,042,363 B1 | 8/2018 | Hayward |
| 10,042,364 B1 | 8/2018 | Hayward |
| 10,054,453 B1 | 8/2018 | Hayward |
| 10,055,982 B1 | 8/2018 | Hayward |
| 10,055,985 B1 | 8/2018 | Hayward |
| 10,057,312 B1 | 8/2018 | Hayward |
| 10,074,139 B2 | 9/2018 | Bogovich et al. |
| 10,089,868 B1 | 10/2018 | Hayward |
| 10,096,038 B2 | 10/2018 | Ramirez et al. |
| 10,096,067 B1 | 10/2018 | Slusar |
| 10,096,070 B1 | 10/2018 | Slusar et al. |
| 10,109,016 B1 | 10/2018 | Saenglongma |
| 10,121,204 B1 | 11/2018 | Brandmaier et al. |
| 10,134,091 B2 | 11/2018 | Adams et al. |
| 10,157,422 B2 | 12/2018 | Jordan et al. |
| 10,169,822 B2 | 1/2019 | Jarvis et al. |
| 10,192,369 B2 | 1/2019 | Wright |
| 10,198,772 B2 | 2/2019 | Parameshwaran |
| 10,198,879 B2 | 2/2019 | Wright |
| 10,203,529 B2 | 2/2019 | Xie |
| 10,210,772 B2 | 2/2019 | Tamir et al. |
| 10,215,573 B1 | 2/2019 | Hayward |
| 10,216,194 B1 | 2/2019 | Hayward |
| 10,216,195 B2 | 2/2019 | Switkes et al. |
| 10,217,169 B2 | 2/2019 | Schumann et al. |
| 10,229,462 B2 | 3/2019 | Bogovich et al. |
| 10,231,093 B2 | 3/2019 | Cordova et al. |
| 10,234,871 B2 | 3/2019 | Klaus et al. |
| 10,255,638 B2 | 4/2019 | Cote et al. |
| 10,255,639 B1 | 4/2019 | Friedman et al. |
| 10,317,223 B1 | 6/2019 | Hayward |
| 10,354,333 B1 | 7/2019 | Hayward |
| 10,354,461 B1 | 7/2019 | Hayward |
| 10,359,782 B1 | 7/2019 | Hayward |
| 10,360,636 B1 | 7/2019 | Kraft et al. |
| 10,360,794 B1 | 7/2019 | Hayward |
| 10,365,662 B1 | 7/2019 | Hayward |
| 10,366,605 B1 | 7/2019 | Hayward |
| 10,373,497 B1 | 8/2019 | Hayward |
| 10,380,694 B1 | 8/2019 | Grant et al. |
| 10,380,699 B2 | 8/2019 | Fernandes et al. |
| 10,380,904 B1 | 8/2019 | Hayward |
| 10,395,319 B1 | 8/2019 | Srey et al. |
| 10,395,320 B1 | 8/2019 | Srey et al. |
| 10,417,713 B1 | 9/2019 | Brandmaier et al. |
| 10,438,424 B2 | 10/2019 | Hassib et al. |
| 10,445,758 B1 | 10/2019 | Bryer et al. |
| 10,451,427 B1 | 10/2019 | Hayward |
| 10,453,338 B1 | 10/2019 | Hayward |
| 10,453,352 B1 | 10/2019 | Hayward |
| 10,509,414 B1 | 12/2019 | Hayward |
| 10,546,491 B1 | 1/2020 | Hayward |
| 10,571,908 B2 | 2/2020 | Joyce et al. |
| 10,572,943 B1 | 2/2020 | Tye et al. |
| 10,634,507 B2 | 4/2020 | Krishnan et al. |
| 10,657,597 B1 | 5/2020 | Billman et al. |
| 10,664,918 B1 | 5/2020 | Slusar |
| 10,699,350 B1 | 6/2020 | Suizzo et al. |
| 10,726,495 B1 | 7/2020 | Saenglongma |
| 10,726,687 B2 | 7/2020 | Song et al. |
| 10,733,673 B1 | 8/2020 | Slusar |
| 10,740,850 B1 | 8/2020 | Slusar |
| 10,755,495 B1 * | 8/2020 | Chan ................... G07C 5/0841 |
| 10,755,566 B2 | 8/2020 | Tennent et al. |
| 10,775,179 B1 | 9/2020 | Hayward |
| 10,783,586 B1 | 9/2020 | Augustine et al. |
| 10,783,587 B1 | 9/2020 | Augustine et al. |
| 10,787,122 B2 | 9/2020 | Adams et al. |
| 10,796,369 B1 | 10/2020 | Augustine et al. |
| 10,803,525 B1 | 10/2020 | Augustine et al. |
| 10,803,529 B2 | 10/2020 | Adams et al. |
| 10,810,681 B1 * | 10/2020 | Parker ................... G06Q 40/08 |
| 10,831,191 B1 | 11/2020 | Fields |
| 10,977,943 B1 | 4/2021 | Hayward |
| 11,004,280 B1 | 5/2021 | Hayward |
| 11,048,269 B1 | 6/2021 | Hayward |
| 11,061,408 B1 | 7/2021 | Hayward |
| 11,105,640 B1 | 8/2021 | Hayward |
| 11,145,000 B1 * | 10/2021 | Baker ................... B60W 50/16 |
| 11,363,426 B1 | 6/2022 | Sanchez |
| 2005/0065711 A1 | 3/2005 | Dahlgren et al. |
| 2007/0054685 A1 | 3/2007 | Kellum |
| 2007/0159354 A1 | 7/2007 | Rosenberg |
| 2007/0174467 A1 | 7/2007 | Ballou et al. |
| 2008/0270519 A1 | 10/2008 | Ekdahl et al. |
| 2009/0024419 A1 | 1/2009 | McClellan et al. |
| 2009/0043435 A1 | 2/2009 | Kane et al. |
| 2010/0015963 A1 | 1/2010 | Hesse et al. |
| 2010/0191391 A1 | 7/2010 | Zeng |
| 2010/0286864 A1 | 11/2010 | Kawauchi et al. |

(56) References Cited

U.S. PATENT DOCUMENTS

| | | |
|---|---|---|
| 2010/0312466 A1 | 12/2010 | Katzer et al. |
| 2011/0161116 A1* | 6/2011 | Peak .................. G01C 21/36 345/173 |
| 2012/0101855 A1 | 4/2012 | Collins et al. |
| 2012/0176254 A1 | 7/2012 | Imanaga |
| 2012/0303392 A1 | 11/2012 | Depura et al. |
| 2012/0316777 A1* | 12/2012 | Kitta .................. G01C 21/3661 701/431 |
| 2013/0006675 A1 | 1/2013 | Bowne et al. |
| 2013/0013347 A1 | 1/2013 | Ling et al. |
| 2013/0013348 A1 | 1/2013 | Ling et al. |
| 2013/0030642 A1 | 1/2013 | Bradley et al. |
| 2013/0081029 A1 | 3/2013 | Levien et al. |
| 2013/0081030 A1 | 3/2013 | Levien et al. |
| 2013/0090139 A1 | 4/2013 | McHenry et al. |
| 2013/0169812 A1 | 7/2013 | Lu et al. |
| 2014/0046701 A1 | 2/2014 | Steinberg et al. |
| 2014/0081675 A1 | 3/2014 | Ives et al. |
| 2014/0142799 A1 | 5/2014 | Ferguson et al. |
| 2014/0309806 A1 | 10/2014 | Ricci |
| 2014/0309870 A1 | 10/2014 | Ricci et al. |
| 2014/0309880 A1 | 10/2014 | Ricci |
| 2014/0309886 A1 | 10/2014 | Ricci |
| 2014/0309891 A1 | 10/2014 | Ricci |
| 2014/0310594 A1 | 10/2014 | Ricci et al. |
| 2014/0310610 A1 | 10/2014 | Ricci |
| 2014/0310739 A1 | 10/2014 | Ricci et al. |
| 2014/0320260 A1 | 10/2014 | Van et al. |
| 2014/0330596 A1 | 11/2014 | Depura et al. |
| 2015/0025917 A1 | 1/2015 | Stempora |
| 2015/0077236 A1 | 3/2015 | Le Masurier |
| 2015/0127570 A1 | 5/2015 | Doughty et al. |
| 2015/0145995 A1 | 5/2015 | Shahraray et al. |
| 2015/0156603 A1* | 6/2015 | Zellner .................. H04W 4/02 455/456.3 |
| 2015/0179062 A1 | 6/2015 | Ralston et al. |
| 2015/0232065 A1 | 8/2015 | Ricci et al. |
| 2015/0262487 A1 | 9/2015 | Cazanas et al. |
| 2015/0266473 A1 | 9/2015 | Hayasaka |
| 2015/0353014 A1 | 12/2015 | Li |
| 2016/0021178 A1 | 1/2016 | Liu et al. |
| 2016/0042644 A1 | 2/2016 | Velusamy |
| 2016/0098369 A1 | 4/2016 | Berkobin |
| 2016/0192108 A1 | 6/2016 | Chaudhary et al. |
| 2016/0196744 A1 | 7/2016 | Razmi |
| 2016/0205419 A1 | 7/2016 | Ricci et al. |
| 2016/0232791 A1 | 8/2016 | Tosa et al. |
| 2016/0277601 A1 | 9/2016 | Seymour |
| 2016/0334227 A1 | 11/2016 | Davidson |
| 2017/0021764 A1 | 1/2017 | Adams et al. |
| 2017/0030725 A1 | 2/2017 | Gordon |
| 2017/0075701 A1 | 3/2017 | Ricci et al. |
| 2017/0113664 A1* | 4/2017 | Nix .................. G08B 13/19669 |
| 2017/0120906 A1 | 5/2017 | Penilla et al. |
| 2017/0178498 A1 | 6/2017 | McErlean |
| 2017/0337813 A1 | 11/2017 | Taylor |
| 2018/0022327 A1 | 1/2018 | Kitagawa et al. |
| 2018/0025648 A1 | 1/2018 | Zlojutro |
| 2018/0096601 A1 | 4/2018 | Chow et al. |
| 2018/0144633 A1 | 5/2018 | Minemura et al. |
| 2018/0201263 A1 | 7/2018 | Slusar et al. |
| 2019/0347925 A1* | 11/2019 | Faltaous ............... H04W 4/029 |
| 2020/0267253 A1 | 8/2020 | Grunfeld |
| 2020/0364661 A1 | 11/2020 | Yamasaki |
| 2021/0041868 A1 | 2/2021 | Fields |

FOREIGN PATENT DOCUMENTS

| | | |
|---|---|---|
| KR | 20180074422 A * | 7/2018 |
| WO | 2018102280 | 6/2018 |
| WO | WO-2021207960 A1 * | 10/2021 |

OTHER PUBLICATIONS

Mann, Building the perfect usage-based insurance mobile app, Insurance Innovation Reporter, Retrieved from https://iireporter.com/building-the-perfect-usage-based-insurance-mobile-app/, Feb. 2016, pp. 1-9.

SmartDriver app frequently asked questions, Only Young Drivers, Retrieved from http://www.onlyyoungdrivers.co.uk/only-young-driver-faq's/smartdriver-app-faq's#, Oct. 2019, 5 pages.

The ultimate guide to GPS tracking for business, Linxup., Retrieved from https://www.linxup.com/thankyou/assets/downloads/ultimate_guide_to_gps.pdf, Oct. 2019, 18 pages.

Palmer, The apps that can track you even after you've uninstalled them, Science & Tech, Daily Mail. Retrieved from https://iirepporter.combuiding-the-perfect-usage-based-insurance-mobile-app/, Feb. 2016, pp. 1-9.

\* cited by examiner

SYSTEMS AND METHODS FOR DETERMINING APPLICATION STATUS

CROSS-REFERENCE TO RELATED APPLICATIONS

This application is a continuation of U.S. patent application Ser. No. 16/913,727, filed Jun. 26, 2020, the entire disclosure of which is incorporated by reference herein for all purposes.

FIELD OF THE DISCLOSURE

Some embodiments of the present disclosure are directed to determining a status of an application. More particularly, certain embodiments of the present disclosure provide methods and systems for determining a status of an application previously installed on a mobile device of a user based at least in part upon a receipt of sensor data of the mobile device during a predetermined time interval. Merely by way of example, the present disclosure has been applied to determining that the application previously installed on the mobile devices is working properly. But it would be recognized that the present disclosure has much broader range of applicability.

BACKGROUND OF THE DISCLOSURE

An application installed on mobile devices of users may provide data generated by one or more sensors of the mobile devices that is related to user behaviors, such as driving behaviors. Such data may be used to generate alert notifications to the users that may reduce the likelihood of a collision or other damage occurring to the vehicles or the users. In other words, the use of the application may function to mitigate or prevent driving risks. Hence it is highly desirable to develop more accurate techniques for determining that the application installed on the mobile devices is working properly.

BRIEF SUMMARY OF THE DISCLOSURE

Some embodiments of the present disclosure are directed to determining a status of an application. More particularly, certain embodiments of the present disclosure provide methods and systems for determining a status of an application previously installed on a mobile device of a user based at least in part upon a receipt of sensor data of the mobile device during a predetermined time interval. Merely by way of example, the present disclosure has been applied to determining that the application previously installed on the mobile devices is working properly. But it would be recognized that the present disclosure has much broader range of applicability.

According to some embodiments, a method for determining a status of an application previously installed on a mobile device of a user includes determining that an application has been installed on a mobile device of a user. The application is configured to transmit first sensor data periodically every first predetermined time interval, and the first sensor data is collected and/or generated by one or more sensors of the mobile device. Also, the method includes determining whether the first sensor data is received from the application at least once during a second predetermined time interval in response to the application having been installed on the mobile device. The second predetermined time interval is longer than the first predetermined time interval. Additionally, the method includes determining that the application does not work properly on the mobile device of the user in response to the first sensor data being not received at least once during the second predetermined time interval. Moreover, the method includes transmitting a notification to the mobile device indicating that the application does not work properly in response to the application not working properly.

According to certain embodiments, a computing device for determining a status of an application previously installed on a mobile device of a user includes one or more processors and a memory that stores instructions for execution by the one or more processors. The instructions, when executed, cause the one or more processors to determine that an application has been installed on a mobile device of a user. The application is configured to transmit first sensor data periodically every first predetermined time interval, and the first sensor data is collected and/or generated by one or more sensors of the mobile device. Also, the instructions, when executed, cause the one or more processors to determine whether the first sensor data is received from the application at least once during a second predetermined time interval in response to the application having been installed on the mobile device. The second predetermined time interval is longer than the first predetermined time interval. Additionally, the instructions, when executed, cause the one or more processors to determine that the application does not work properly on the mobile device of the user in response to the first sensor data being not received at least once during the second predetermined time interval. Moreover, the instructions, when executed, cause the one or more processors to transmit a notification to the mobile device indicating that the application does not work properly in response to the application not working properly.

According to some embodiments, a non-transitory computer-readable medium stores instructions for determining a status of an application previously installed on a mobile device of a user. The instructions are executed by one or more processors of a computing device. The non-transitory computer-readable medium includes instructions to determine that an application has been installed on a mobile device of a user. The application is configured to transmit first sensor data periodically every first predetermined time interval, and the first sensor data is collected and/or generated by one or more sensors of the mobile device. Also, the non-transitory computer-readable medium includes instructions to determine whether the first sensor data is received from the application at least once during a second predetermined time interval in response to the application having been installed on the mobile device. The second predetermined time interval being longer than the first predetermined time interval. Additionally, the non-transitory computer-readable medium includes instructions to determine that the application does not work properly on the mobile device of the user in response to the first sensor data being not received at least once during the second predetermined time interval. Moreover, the non-transitory computer-readable medium includes instructions to transmit a notification to the mobile device indicating that the application does not work properly in response to the application not working properly.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Some embodiments of the present disclosure are directed to determining a status of an application. More particularly, certain embodiments of the present disclosure provide methods and systems for determining a status of an application previously installed on a mobile device of a user based at least in part upon a receipt of sensor data of the mobile device during a predetermined time interval. Merely by way of example, the present disclosure has been applied to determining that the application previously installed on the mobile devices is working properly. But it would be recognized that the present disclosure has much broader range of applicability.

Figure 1:
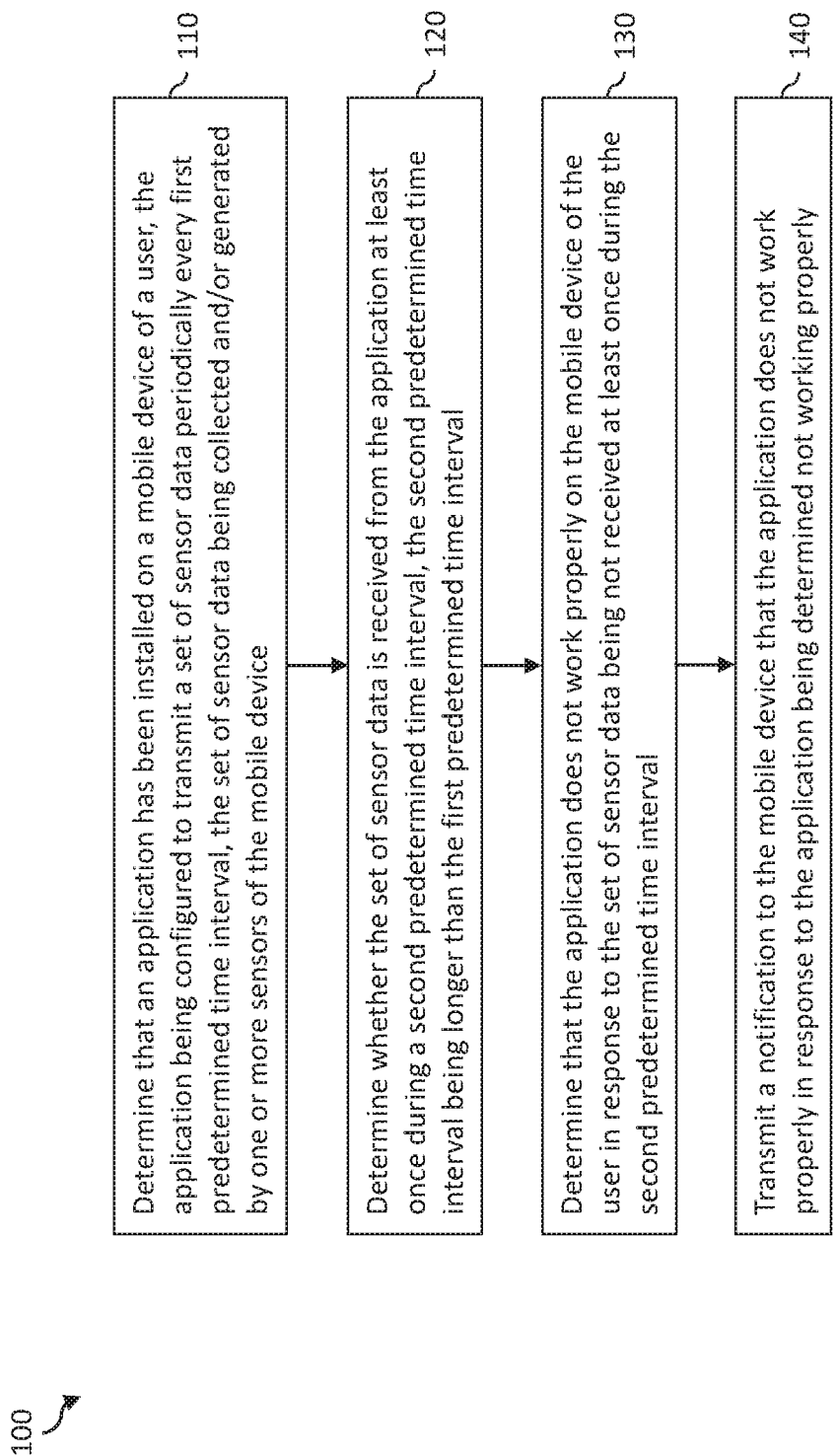
FIG. 1 is a simplified diagram showing a method for determining a status of an application previously installed on a mobile device of a user according to certain embodiments of the present disclosure.

I. One or More Methods for Determining a Status of an Application According to Certain Embodiments FIG. 1 is a simplified diagram showing a method 100 for determining a status of an application previously installed on a mobile device of a user according to certain embodiments of the present disclosure. This diagram is merely an example, which should not unduly limit the scope of the claims. One of ordinary skill in the art would recognize many variations, alternatives, and modifications. In the illustrative embodiment, the method 100 is performed by a computing device (e.g., a server 406 that is communicatively coupled to the mobile device). However, it should be appreciated that, in some embodiments, some of the method 100 is performed by the mobile device.

The method 100 includes process 110 for determining that an application associated with an insurer has been installed on a mobile device of a user, wherein the application is configured to transmit a set of sensor data periodically every first predetermined time interval, process 120 for determining whether the set of sensor data is received from the application at least once during a second predetermined time interval, process 130 for determining that the application does not work properly on the mobile device of the user, and process 140 for transmitting a notification to the mobile device indicating that the application does not work properly in response to the application being determined not working properly. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, although the method 100 is described as performed by the computing device above, some or all processes of the method are performed by any computing device or a processor directed by instructions stored in memory. As an example, some or all processes of the method are performed according to instructions stored in a non-transitory computer-readable medium.

Specifically, at the process 110, the application that is installed on the mobile device is configured to transmit the set of sensor data that was collected and/or generated by one or more sensors of the mobile device according to some embodiments. For example, the application broadcasts the set of sensor data to be received by nearby devices and/or directly transmits the set of sensor data to a destination computing device (e.g., a server that is communicatively coupled to the mobile device). According to certain embodiments, the set of sensor data includes information related to a user activity (e.g., driving behavior). As an example, the user driving behavior represents a manner in which the user has operated a vehicle. For example, the user driving behavior indicates the user's past driving habits and/or past driving patterns.

According to some embodiments, the past user driving data are collected from one or more sensors associated with the user's mobile device. For example, the one or more sensors include any type and number of accelerometers, gyroscopes, magnetometers, location sensors (e.g., GPS sensors), and/or any other suitable sensors that measure the state and/or movement of the mobile device. In certain embodiments, the set of sensor data is collected continuously or at predetermined time intervals. According to certain embodiments, the set of sensor data is collected based on a triggering event. For example, the set of sensor data is collected when each sensor has acquired a threshold amount of sensor measurements.

According to some embodiments, the application is configured to transmit the set of sensor data periodically every first predetermined tune interval when the application is triggered by a predetermined event. For example, in other words, the application works properly in the background and does not transmit any sensor data until the predetermined event occurs. As an example, this reduces a battery power consumption and preserves battery life. For example, the predetermined event is a driving event. According to certain embodiments, the application determines the driving event based on the sensor data collected or generated by the mobile device. Additionally or alternatively, the application receives an input from the user that indicates that the user is driving according to certain embodiments.

According to some embodiments, the computing device determines that the application has been installed on the mobile device of the user if the computing device receives or detects the set of sensor data that is transmitted by the application. However, in some other embodiments, the computing device determines that the application has been installed on the mobile device by monitoring a download of the application on the mobile device and/or a usage of the application by the user of the mobile device (e.g., account login activities).

At the process 120, to determine whether the application that is installed on the mobile device is working properly, the computing device determines whether the set of sensor data is received from at least once during a second predetermined time interval according to some embodiments. In the illustrative embodiment, the second predetermined time interval is longer than the first predetermined time interval. For example, if the application is configured to transmit a set of sensor data every 1 second, the computing device determines whether at least one set of sensor data has been received in the past 6 hours.

At the process 130, if the set of sensor data is not received at least once during the second predetermined time period, the application is determined to be not working properly on the mobile device of the user according to some embodiments. For example, as described above, the application is configured to transmit the set of sensor data when the application is triggered by a predetermined event. In such an example, the computing device determines that the application is not working properly on the mobile device if the computing device does not receive the set of sensor data in the occurrence of the predetermined event.

According to some embodiments, the application is properly installed on the mobile device and is previously running in the background to transmit the set of sensor data. However, in certain embodiments, the application has been forced to be turned off or has been deleted from the mobile device after the proper installation. In such embodiments, the set of sensor data is not being transmitted to the computing device.

According to certain embodiments, the application is properly installed on the mobile device but may not communicate with one or more sensors of the mobile device due to an error. In such embodiments, the set of sensor data is not being transmitted to the computing device, and the application is determined to be not working properly.

At the process 140, in response to the application being determined not working properly, a notification is transmitted to the mobile device. For example, the notification notifies the user that the application is not working properly and asks the user to verify that the application is installed on the mobile device. According to some embodiments, the notification includes instructions how to troubleshoot the application. As an example, the instructions further include contact information (e.g., a phone number and/or an email address) for technical support. According to certain embodiments, the notification includes a message from the insurer that the amount of insurance discount may be updated or adjusted if the application is not working properly to provide the sensor data.

Figure 2:
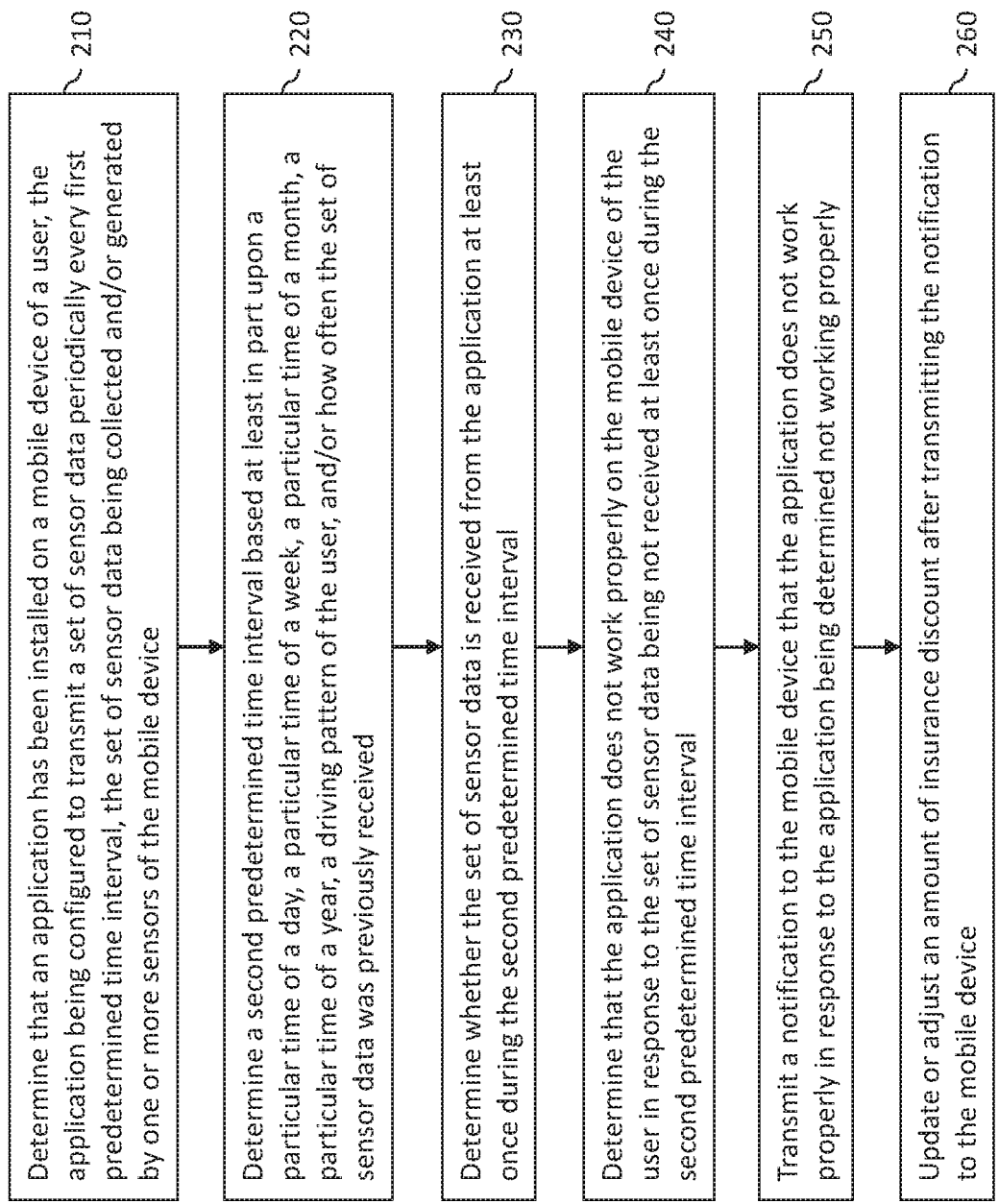
FIG. 2 is a simplified diagram showing a method for determining a status of an application previously installed on a mobile device of a user according to some embodiments of the present disclosure.

FIG. 2 is a simplified diagram showing a method 200 for determining a status of an application previously installed on a mobile device of a user according to certain embodiments of the present disclosure. This diagram is merely an example, which should not unduly limit the scope of the claims. One of ordinary skill in the art would recognize many variations, alternatives, and modifications. In the illustrative embodiment, the method 200 is performed by a computing device (e.g., a server 406 that is communicatively coupled to the mobile device). However, it should be appreciated that, in some embodiments, some of the method 200 is performed by the mobile device.

The method 200 includes process 210 for determining that an application associated with an insurer has been installed on a mobile device of a user, wherein the application is configured to transmit a set of sensor data periodically every first predetermined time interval, process 220 for determining a second predetermined time interval, process 230 for determining whether the set of sensor data is received from the application at least once during the second predetermined time interval, process 240 for determining that the application does not work properly on the mobile device of the user, process 250 for transmitting a notification to the mobile device indicating that the application does not work properly in response to the application being determined not working properly, and process 260 for updating or adjusting an amount of insurance discount. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, although the method 200 is described as performed by the computing device above, some or all processes of the method are performed by any computing device or a processor directed by instructions stored in memory. As an example, some or all processes of the method are performed according to instructions stored in a non-transitory computer-readable medium.

Specifically, at the process 210, the application that is installed on the mobile device is configured to transmit the set of sensor data that was collected and/or generated by one or more sensors of the mobile device according to some embodiments. For example, the application broadcasts the set of sensor data to be received by nearby devices and/or directly transmits the set of sensor data to a destination computing device (e.g., a server that is communicatively coupled to the mobile device). According to certain embodiments, the set of sensor data includes information related to a user activity (e.g., driving behavior). As an example, the user driving behavior represents a manner in which the user has operated a vehicle. For example, the user driving behavior indicates the user's past driving habits and/or past driving patterns.

According to some embodiments, the past user driving data are collected from one or more sensors associated with the user's mobile device. For example, the one or more sensors include any type and number of accelerometers, gyroscopes, magnetometers, location sensors (e.g., GPS sensors), and/or any other suitable sensors that measure the state and/or movement of the mobile device. In certain embodiments, the set of sensor data is collected continuously or at predetermined time intervals. According to certain embodiments, the set of sensor data is collected based on a triggering event. For example, the set of sensor data is collected when each sensor has acquired a threshold amount of sensor measurements.

According to some embodiments, the application is configured to transmit the set of sensor data periodically every first predetermined time interval when the application is triggered by a predetermined event. As an example, in other words, the application works properly in the background and may not transmit any sensor data until the predetermined event occurs. This reduces a battery power consumption and preserve battery life according to some embodiments. For example, the predetermined event is a driving event. According to certain embodiments, the application determines the driving event based on the sensor data collected or generated by the mobile device. Additionally or alternatively, the application receives an input from the user that indicates that the user is driving according to some embodiments.

According to some embodiments, the computing device determines that the application has been installed on the mobile device of the user if the computing device receives or detects the set of sensor data that is transmitted by the application. However, in some other embodiments, the computing device determines that the application has been installed on the mobile device by monitoring a download of the application on the mobile device and/or a usage of the application by a user of the mobile device (e.g., account login activities).

At the process 220, the second predetermined time interval indicates a time interval that the set of sensor data is expected to be transmitted at least once by the application according to some embodiments. As discussed above, according to some embodiments, the sensor data is not continuously collected or generated by the one or more sensors of the mobile device. Even if the sensor data is continuously generated, such sensor data is not transmitted every first predetermined time interval all day long to preserve battery power according to some embodiments. For example, instead, as described above, the sensor data is transmitted when triggered by a predetermined event. Additionally or alternatively, the sensor data is transmitted based upon a particular time of a day, a particular time of a week, a particular time of a month, a particular time of a year, or any combination thereof according to some embodiments.

Accordingly, in the illustrative embodiment, the second predetermined time interval is determined based upon a particular time of a day, a particular time of a week, a particular time of a month, a particular time of a year, or any combination thereof. According to some embodiments, the second predetermined time interval is tailored to the user of the mobile device. For example, the second predetermined time interval is based upon how often the set of sensor data was previously received from the application and/or a life routine or pattern of the user (e.g., a driving pattern) at a particular time of a day, a particular time of a week, a particular time of a month, a particular time of a year, or any combination thereof. For example, these user data are obtained directly from the user or determined or predicted based on the previous sensor data.

As discussed above, according to certain embodiments, the application transmits the set of sensor data when it is triggered by a predetermined event, such as a driving event. In such embodiments, a driving pattern of the user is used to determine when the sensor data is expected to be received. For example, if the user typically drives to and from work between 8 AM-9 AM and 5 PM-6 PM, 5 days (Mondays to Fridays) a week, the application is expected to transmit the sensor data during those time periods.

According to some embodiments, the second predetermined time interval is determined using one or more machine learning algorithms, programs, modules, or models based upon the historical sensor data and/or information received from the user. According to certain embodiments, the second predetermined time interval is defined and provided by the insurer.

At the process 230, to determine whether the application that is installed on the mobile device is working properly, the computing device determines whether the set of sensor data is received from at least once during the second predetermined time interval according to some embodiments. For example, as discussed above, the second predetermined time period depends on the particular time of a day, the particular time of a week, the particular time of a month, the particular time of a year, or any combination thereof.

Referring to the example above, at 9 AM on Monday, the computing device determines whether a set of sensor data is received from the application at least once during the past hour according to some embodiments. However, for example, at 2 PM on Tuesday, the computing device determines whether a set of sensor data is received from the application at least once during the past six hours to determine whether the application is working properly.

At the process 240, if the set of sensor data is not received at least once during the second predetermined time period, the application is determined to be not working properly on the mobile device of the user according to some embodiments. For example, as described above, the application is configured to transmit the set of sensor data when the application is triggered by a predetermined event. In such an example, the computing device determines that the application is not working properly on the mobile device if the computing device does not receive the set of sensor data in the occurrence of the predetermined event.

According to some embodiments, the application is properly installed on the mobile device and is previously running in the background to transmit the set of sensor data. However, in certain embodiments, the application has been forced to be turned off or has been deleted from the mobile device after the proper installation. In such embodiments, the set of sensor data is not being transmitted to the computing device.

According to certain embodiments, the application is properly installed on the mobile device but may not communicate with one or more sensors of the mobile device due to an error. In such embodiments, the set of sensor data is not being transmitted to the computing device, and the application is determined to be not working properly.

At the process 250, in response to the application being determined not working properly, a notification is transmitted to the mobile device according to some embodiments. For example, the notification notifies the user that the application is not working properly and asks the user to verify that the application is installed on the mobile device. According to some embodiments, the notification includes instructions how to troubleshoot the application. As an example, the instructions further include contact information (e.g., a phone number and/or an email address) for technical support. According to certain embodiments, the notification includes a message from the insurer that the amount of insurance discount may be updated or adjusted if the application is not working properly to provide the sensor data.

At the process 260, after transmitting the notification to the mobile device, the amount of insurance discount is updated or adjusted to reflect that the application is not working properly according to some embodiments. According to certain embodiments, the user receives an initial discount from an insurer for installing the application and authorizing the application to transmit the set of sensor data collected and/or generated by one or more sensors of the mobile device. For example, as discussed above, the sensor data includes information related to a user activity, such as driving behavior. As an example, the sensor data provided by the application related to the driving behavior of the user is used to generate alert notifications to the user that may reduce the likelihood of a collision or other damage occurring to the vehicle or the user. In other words, because the use of the application functions to mitigate or prevent driving risks upon which an insurance policy is partially based, the insurer provides an additional discount to the user for installing and continuing to use the application according to some embodiments. As such, for example, in response to determining that the application is not working properly to provide the sensor data, the insurance discounts, premiums, rates, points, or programs is calculated, updated, and/or adjusted. In certain embodiments, the updated or adjusted insurance discount, premiums, rates, points, or programs is communicated to the user for the user's review, modification, and/or approval.

According to some embodiments, determining whether the application is installed on the mobile device in the process 110 as shown in FIG. 1 is performed by the process 210. According to certain embodiments, the second predetermined time interval as determined by the process 220 is used by the process 120 as shown in FIG. 1. According to some embodiments, determining whether the application is working properly in process 130 as shown in FIG. 1 is performed by the process 240. According to certain embodiments, transmitting the notification to the mobile device in process 140 as shown in FIG. 1 is performed by the process 250.

Figure 3A:
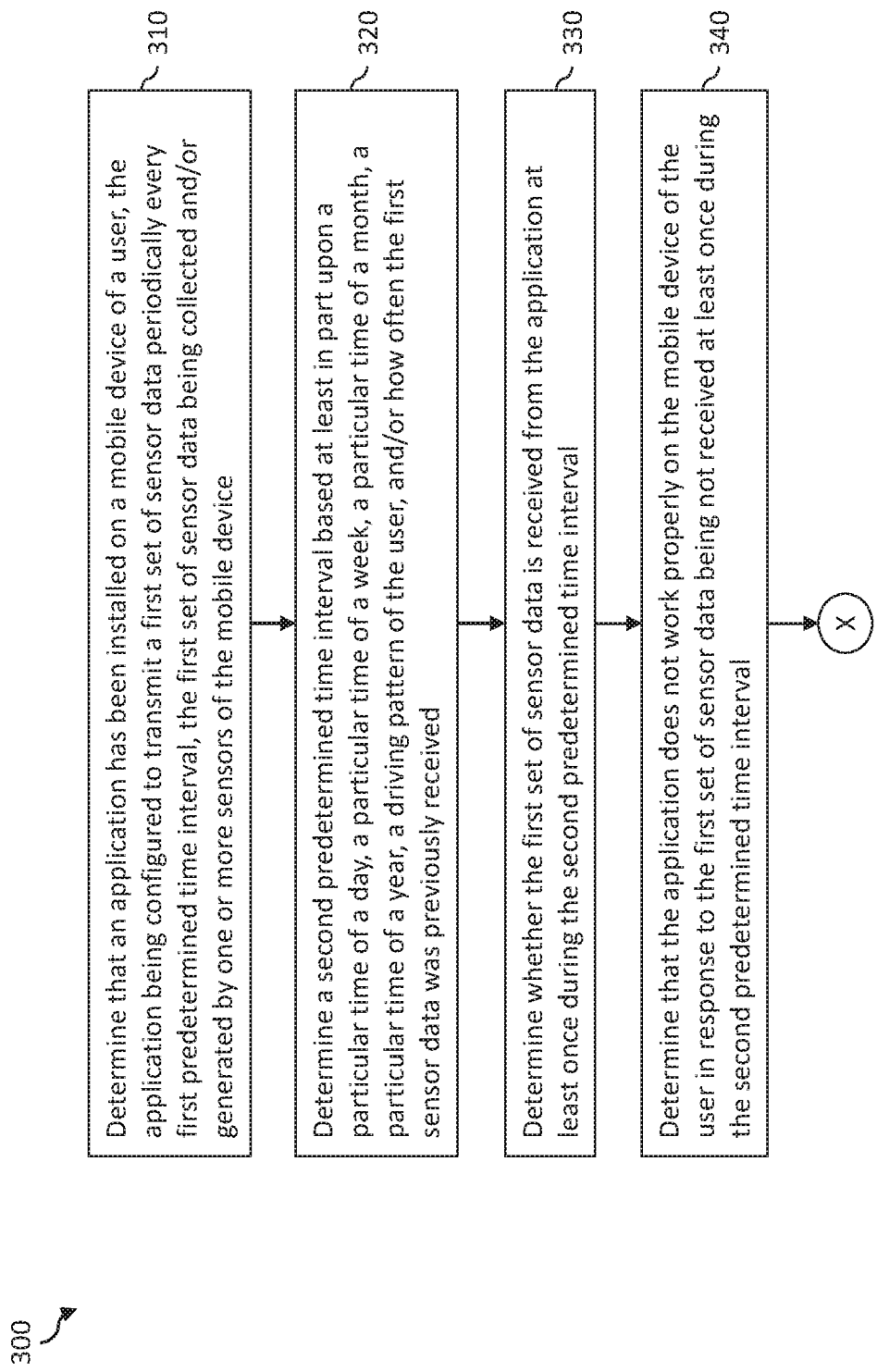
FIGS. 3A and 3B are simplified diagrams showing a method for determining a status of an application previously installed on a mobile device of a user according to certain embodiments of the present disclosure.
Figure 3B:
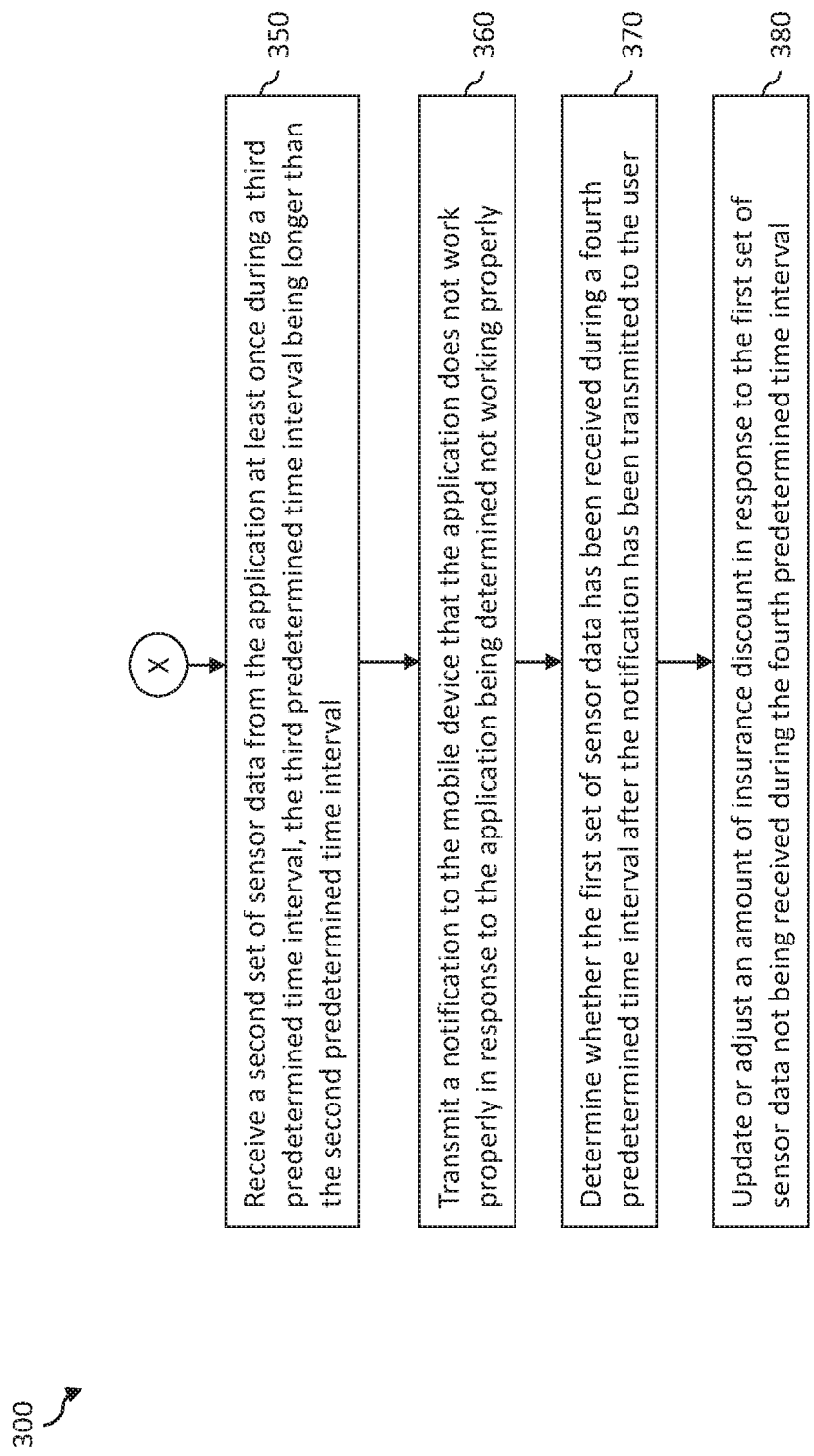

FIGS. 3A and 3B are simplified diagrams showing a method for determining a status of an application previously installed on a mobile device of a user according to certain embodiments of the present disclosure. This diagram is merely an example, which should not unduly limit the scope of the claims. One of ordinary skill in the art would recognize many variations, alternatives, and modifications. In the illustrative embodiment, the method 300 is performed by a computing device (e.g., a server 406 that is communicatively coupled to the mobile device). However, it should be appreciated that, in some embodiments, some of the method 300 is performed by the mobile device.

The method 300 includes process 310 for determining that an application associated with an insurer has been installed on a mobile device of a user, wherein the application is configured to transmit a first set of sensor data periodically every first predetermined time interval, process 320 for determining a second predetermined time interval, process 330 for determining whether the first set of sensor data is received from the application at least once during the second predetermined time interval, process 340 for determining that the application does not work properly on the mobile device of the user, process 350 for receiving a second set of sensor data from the application at least once during a third predetermined time period, process 360 for transmitting a notification to the mobile device indicating that the application does not work properly in response to the application being determined not working properly, process 370 for determining whether the first set of sensor data has been received during a fourth predetermined time interval after a transmission of the notification, and process 380 for updating or adjusting an amount of insurance discount. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, although the method 300 is described as performed by the computing device above, some or all processes of the method are performed by any computing device or a processor directed by instructions stored in memory. As an example, some or all processes of the method are performed according to instructions stored in a non-transitory computer-readable medium.

Specifically, at the process 310, the application that is installed on the mobile device is configured to transmit the first set of sensor data that was collected and/or generated by one or more sensors of the mobile device according to some embodiments. For example, the application broadcasts the first set of sensor data to be received by nearby devices and/or directly transmits the first set of sensor data to a destination computing device (e.g., a server that is communicatively coupled to the mobile device). According to certain embodiments, the first set of sensor data includes information related to a user activity (e.g., driving behavior). As an example, the user driving behavior represents a manner in which the user has operated a vehicle. For example, the user driving behavior indicates the user's past driving habits and/or past driving patterns.

According to some embodiments, the past user driving data are collected from one or more sensors associated with the user's mobile device. For example, the one or more sensors include any type and number of accelerometers, gyroscopes, magnetometers, location sensors (e.g., GPS sensors), and/or any other suitable sensors that measure the state and/or movement of the mobile device. In certain embodiments, the first set of sensor data is collected continuously or at predetermined time intervals. According to certain embodiments, the first set of sensor data is collected based on a triggering event. For example, the first set of sensor data is collected when each sensor has acquired a threshold amount of sensor measurements.

According to some embodiments, the application is configured to transmit the first set of sensor data periodically every first predetermined time interval when the application is triggered by a predetermined event. As an example, in other words, the application works properly in the background and does not transmit any sensor data until the predetermined event occurs. This reduces a battery power consumption and preserves battery life according to certain embodiments. For example, the predetermined event is a driving event. According to certain embodiments, the application determines the driving event based on the sensor data collected or generated by the mobile device. Additionally or alternatively, the application receives an input from the user that indicates that the user is driving.

According to some embodiments, the computing device determines that the application has been installed on the mobile device of the user if the computing device receives or detects the first set of sensor data that is transmitted by the application. However, in some other embodiments, the computing device determines that the application has been installed on the mobile device by monitoring a download of the application on the mobile device and/or usage of the application by a user of the mobile device account login activities).

At the process 320, the second predetermined time interval indicates a time interval that the first set of sensor data is expected to be transmitted at least once by the application according to some embodiments. As discussed above, according to certain embodiments, the sensor data is not continuously collected or generated by the one or more sensors of the mobile device. Even if the sensor data is continuously generated, such sensor data is not transmitted every first predetermined time interval all day long to preserve battery power according to some embodiments. Instead, as described above, the sensor data is transmitted when triggered by a predetermined event. Additionally or alternatively, the sensor data is transmitted based upon a particular time of a day, a particular time of a week, a particular time of a month, a particular time of a year, or any combination thereof.

Accordingly, in the illustrative embodiment, the second predetermined time interval is determined based upon a particular time of a day, a particular time of a week, a particular time of a month, a particular time of a year, or any combination thereof. According to some embodiments, the second predetermined time interval is tailored to the user of the mobile device. For example, the second predetermined time interval is based upon how often the first set of sensor data was previously received from the application and/or a life routine or pattern of the user (e.g. a driving pattern) at a particular time of a day, a particular time of a week, a particular time of a month, a particular time of a year, or any combination thereof. These user data are obtained directly from the user or determined or predicted based on the previous sensor data.

As discussed above, according to certain embodiments, the application transmits the first set of sensor data when it is triggered by a predetermined event, such as a driving event. In such embodiments, a driving pattern of the user is used to determine when the sensor data is expected to be received. For example, if the user typically drives to and from work between 8 AM-9 AM and 5 PM-6 PM, 5 days (Mondays to Fridays) a week, the application is expected to transmit the sensor data during those time periods.

According to some embodiments, the second predetermined time interval is determined using one or more machine learning algorithms, programs, modules, or models based upon the historical sensor data and/or information received from the user. According to certain embodiments, the second predetermined time interval is defined and provided by the insurer.

At the process 330, to determine whether the application that is installed on the mobile device is working properly, the computing device determines whether the first set of sensor data is received from at least once during the second predetermined time interval according to some embodiments. For example, as discussed above, the second predetermined time period depends on the particular time of a day, the particular time of a week, the particular time of a month, the particular time of a year, or any combination thereof.

Referring to the example above, at 9 AM on Monday, the computing device determines whether a first set of sensor data is received from the application at least once during the past hour according to certain embodiments. However, for example, at 2 PM on Tuesday, the computing device determines whether a first set of sensor data is received from the application at least once during the past six hours to determine whether the application is working properly.

At the process 340, if the first set of sensor data is not received at least once during the second predetermined time period, the application is determined to be not working properly on the mobile device of the user according to some embodiments. For example, as described above, the application is configured to transmit the first set of sensor data when the application is triggered by a predetermined event. In such an example, the computing device determines that the application is not working properly on the mobile device if the computing device does not receive the first set of sensor data in the occurrence of the predetermined event.

According to some embodiments, the application is properly installed on the mobile device and is previously running in the background to transmit the set of sensor data. However, in certain embodiments, the application has been forced to be turned off or has been deleted from the mobile device after the proper installation. In such embodiments, the set of sensor data is not being transmitted to the computing device.

According to certain embodiments, the application is properly installed on the mobile device but may not communicate with one or more sensors of the mobile device due to an error. In such embodiments, the first set of sensor data is not being transmitted to the computing device, and the application is determined to be not working properly.

At the process 350, the computing device further receives the second set of sensor data from the application at least once during the third predetermined time interval according to some embodiments. In the illustrative embodiment, the second set of sensor data is different, at least in part, from the first sensor data, and the third predetermined time interval is longer than the second predetermined time interval. For example, as described above, the application is configured to transmit the first set of sensor data periodically every first predetermined time interval. As an example, such transmission requires using battery power and cellular data. To reduce the battery consumption and cellular data usage, the amount of data that is included in the first set of sensor data may be limited according to certain embodiments. As such, for example, the application is further configured to transmit the second set of sensor data that includes more detailed information. According to some embodiments, the application transmits the second set of sensor data every 24 hours (e.g., at midnight when the user is likely to be at home and the mobile device is likely to be connected to a Wi-Fi and a battery charger). Additionally or alternatively, the application transmits the second set of sensor data when the mobile device is connected to a Wi-Fi and/or a battery charger according to certain embodiments. It should be appreciated that, in some embodiments, the user defines the third predetermined time interval and/or the time at which the second set of sensor data is to be transmitted by the application.

At the process 360, in response to the application being determined not working properly, a notification is transmitted to the mobile device according to some embodiments. For example, the notification notifies the user that the application is not working properly and asks the user to verify that the application is installed on the mobile device. According to some embodiments, the notification includes instructions how to troubleshoot the application. As an example, the instructions further include contact information (e.g., a phone number and/or an email address) for technical support. According to certain embodiments, the notification includes a message from the insurer that the amount of insurance discount may be updated or adjusted if the application is not working properly to provide the sensor data.

At the process 370, the computing device further determines whether the first set of sensor data has been received during a fourth predetermined time interval after the notification has been transmitted to the user according to some embodiments. For example, in other words, the computing device determines whether the user has taken an action to ensure that the application is working properly in response to being notified that the application is not working properly. As an example, if the application is working properly again, then the first set of sensor data is expected to be transmitted by the application at least once during the fourth predetermined time interval (e.g., 24 hours). According to some embodiments, the notification includes a time frame (i.e., the fourth predetermined time interval) of which that the user is required to attend to the problem to avoid the insurance discount adjustment. According to certain embodiments, the fourth predetermined time interval is predetermined by the insurer associated with the computing device.

At the process 380, in response to determining that the first set of sensor data has not been received during the fourth predetermined time interval, the computing device determines that the application is not working properly according to some embodiments. For example, as such, the amount of insurance discount is updated or adjusted to reflect that the status of the application. According to some embodiments, the user receives an initial discount from an insurer for installing the application and authorizing the application to transmit the first set of sensor data collected and/or generated by one or more sensors of the mobile device. For example, as discussed above, the sensor data includes information related to a user activity, such as driving behavior. As an example, the sensor data provided by the application related to the driving behavior of the user is used to generate alert notifications to the user that may reduce the likelihood of a collision or other damage occurring to the vehicle or the user. In other words, because the use of the application functions to mitigate or prevent driving risks upon which an insurance policy is partially based, the insurer provides an additional discount to the user for installing and continuing to use the application according to certain embodiments. As such, for example, in response to determining that the application is not working properly to provide the sensor data, the insurance discounts, premiums, rates, points, or programs is calculated, updated, and/or adjusted. In certain embodiments, the updated or adjusted insurance discount, premiums, rates, points, or programs is communicated to the user for the user's review, modification, and/or approval.

According to some embodiments, determining whether the application is installed on the mobile device in the processes 110, 210 as shown in FIG. 1 and FIG. 2, respectively, is performed by the process 310. According to certain embodiments, the second predetermined time interval as determined by the processes 220, 320 is used by the process 120 as shown in FIG. 1. According to some embodiments, determining whether the application is working properly in process 130 as shown in FIG. 1 is performed by the processes 240, 340 as shown in FIG. 2 and FIG. 3A, respectively. According to certain embodiments, transmitting the notification to the mobile device in process 140 as shown in FIG. 1 is performed by the processes 250 and 360 as shown in FIG. 2 and FIG. 3B, respectively. According to some embodiments, updating or adjusting the amount of insurance discount in process 380 as shown in FIG. 3B is used by the process 260 as shown in FIG. 2.

In some examples, the determined one or more past driving features relate to the one or more past user driving features in the process 120 of the method 100 as shown in FIG. 1 and/or in the process 220 of the method 200 as shown in FIG. 2.

Figure 4:
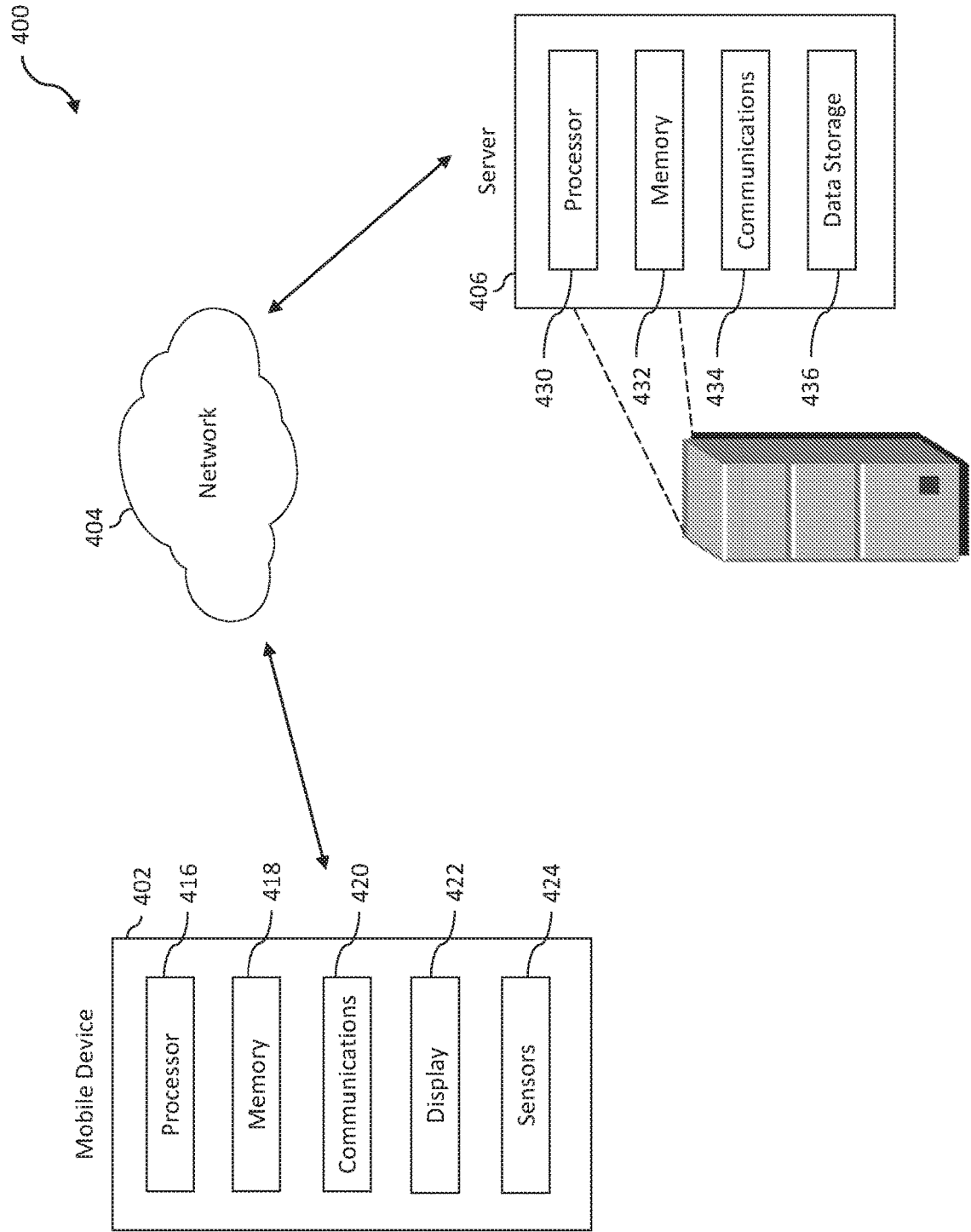
FIG. 4 is a simplified diagram showing a system for determining a status of an application previously installed on a mobile device of a user according to certain embodiments of the present disclosure.

II. One or More Systems for Determining a Status of an Application According to Certain Embodiments FIG. 4 is a simplified diagram showing a system for determining a status of an application previously installed on a mobile device according to certain embodiments of the present disclosure. This diagram is merely an example, which should not unduly limit the scope of the claims. One of ordinary skill in the art would recognize many variations, alternatives, and modifications. In the illustrative embodiment, the system 400 includes a mobile device 402, a network 404, and a server 406. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 400 is used to implement the method 100, the method 200, and/or the method 300. According to certain embodiments, the mobile device 402 is communicatively coupled to the server 406 via the network 404. As an example, the mobile device 402 includes one or more processors 416 (e.g., a central processing unit (CPU), a graphics processing unit (GPU)), a memory 418 (e.g., random-access memory (RAM), read-only memory (ROM), flash memory), a communications unit 420 (e.g., a network transceiver), a display unit 422 (e.g., a touchscreen), and one or more sensors 424 (e.g., an accelerometer, a gyroscope, a magnetometer, a location sensor). For example, the one or more sensors 424 are configured to generate sensor data. According to some embodiments, the data are collected continuously, at predetermined time intervals, and/or based on a triggering event (e.g., when each sensor has acquired a threshold amount of sensor measurements).

In some embodiments, the mobile device 402 is operated by the user. For example, the user installs an application associated with an insurer on the mobile device 402 and allows the application to communicate with the one or more sensors 424 to collect sensor data. According to some embodiments, the application collects the sensor data continuously, at predetermined time intervals, and/or based on a triggering event (e.g., when each sensor has acquired a threshold amount of sensor measurements). In certain embodiments, the sensor data represents the user's activity/behavior, such as the user driving behavior, in the method 100, the method 200, and/or the method 300.

According to certain embodiments, the collected data are stored in the memory 418 before being transmitted to the server 406 using the communications unit 422 via the network 404 (e.g., via a local area network (LAN), a wide area network (WAN), the Internet). In some embodiments, the collected data are transmitted directly to the server 406 via the network 404. In certain embodiments, the collected data are transmitted to the server 406 via a third party. For example, a data monitoring system stores any and all data collected by the one or more sensors 424 and transmits those data to the server 406 via the network 404 or a different network.

According to certain embodiments, the server 406 includes a processor 430 (e.g., a microprocessor, a microcontroller), a memory 432, a communications unit 434 (e.g., a network transceiver), and a data storage 436 (e.g., one or more databases). In some embodiments, the server 406 is a single server, while in certain embodiments, the server 406 includes a plurality of servers with distributed processing. As an example, in FIG. 4, the data storage 436 is shown to be part of the server 406. In some embodiments, the data storage 436 is a separate entity coupled to the server 406 via a network such as the network 404. In certain embodiments, the server 406 includes various software applications stored in the memory 432 and executable by the processor 430. For example, these software applications include specific programs, routines, or scripts for performing functions associated with the method 100, the method 200, and/or the method 300. As an example, the software applications include general-purpose software applications for data processing, network communication, database management, web server operation, and/or other functions typically performed by a server.

According to various embodiments, the server 406 receives, via the network 404, the sensor data collected by the one or more sensors 424 from the application using the communications unit 434 and stores the data in the data storage 436. For example, the server 406 then processes the data to perform one or more processes of the method 100, one or more processes of the method 200, and/or one or more processes of the method 300.

According to certain embodiments, the notification in response to the application being determined not working properly in the method 100, the method 200, and/or the method 300 is transmitted back to the mobile device 402, via the network 404, to be provided (e.g., displayed) to the user via the display unit 422.

In some embodiments, one or more processes of the method 100, one or more processes of the method 200, and/or one or more processes of the method 300 are performed by the mobile device 402. For example, the processor 416 of the mobile device 402 processes the data collected by the one or more sensors 424 to perform one or more processes of the method 100, one or more processes of the method 200, and/or one or more processes of the method 300.

III. Examples of Certain Embodiments of the Present Disclosure

According to some embodiments, a method for determining a status of an application previously installed on a mobile device of a user includes determining that an application has been installed on a mobile device of a user. The application is configured to transmit first sensor data periodically every first predetermined time interval, and the first sensor data is collected and/or generated by one or more sensors of the mobile device. Also, the method includes determining whether the first sensor data is received from the application at least once during a second predetermined time interval in response to the application having been installed on the mobile device. The second predetermined time interval is longer than the first predetermined time interval, Additionally, the method includes determining that the application does not work properly on the mobile device of the user in response to the first sensor data being not received at least once during the second predetermined time interval. Moreover, the method includes transmitting a notification to the mobile device indicating that the application does not work properly in response to the application not working properly. For example, the method is implemented according to at least FIG. 1, FIG. 2, and/or FIGS. 3A and 3B.

According to certain embodiments, a computing device for determining a status of an application previously installed on a mobile device of a user includes one or more processors and a memory that stores instructions for execution by the one or more processors. The instructions, when executed, cause the one or more processors to determine that an application has been installed on a mobile device of a user. The application is configured to transmit first sensor data periodically every first predetermined time interval, and the first sensor data is collected and/or generated by one or more sensors of the mobile device. Also, the instructions, when executed, cause the one or more processors to determine whether the first sensor data is received from the application at least once during a second predetermined time interval in response to the application having been installed on the mobile device. The second predetermined time interval is longer than the first predetermined time interval. Additionally, the instructions, when executed, cause the one or more processors to determine that the application does not work properly on the mobile device of the user in response to the first sensor data being not received at least once during the second predetermined time interval. Moreover, the instructions, when executed, cause the one or more processors to transmit a notification to the mobile device indicating that the application does not work properly in response to the application not working properly. For example, the computing device is implemented according to at least FIG. 4.

According to some embodiments, a non-transitory computer-readable medium stores instructions for determining a status of an application previously installed on a mobile device of a user. The instructions are executed by one or more processors of a computing device. The non-transitory computer-readable medium includes instructions to determine that an application has been installed on a mobile device of a user. The application is configured to transmit first sensor data periodically every first predetermined time interval, and the first sensor data is collected and/or generated by one or more sensors of the mobile device. Also, the non-transitory computer-readable medium includes instructions to determine whether the first sensor data is received from the application at least once during a second predetermined time interval in response to the application having been installed on the mobile device. The second predetermined time interval being longer than the first predetermined time interval. Additionally, the non-transitory computer-readable medium includes instructions to determine that the application does not work properly on the mobile device of the user in response to the first sensor data being not received at least once during the second predetermined time interval. Moreover, the non-transitory computer-readable medium includes instructions to transmit a notification to the mobile device indicating that the application does not work properly in response to the application not working properly. For example, the non-transitory computer-readable medium is implemented according to at least FIG. 1, FIG. 2, FIGS. 3A and 3B, and/or FIG. 4.

IV. Examples of Machine Learning According to Certain Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

V. Additional Considerations According to Certain Embodiments

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include mobile devices and servers. A mobile device and server are generally remote from each other and typically interact through a communication network. The relationship of mobile device and server arises by virtue of computer programs running on the respective computers and having a mobile device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for determining a status of an application on a mobile device of a user, the method comprising:
    determining, by a computing device, whether a first sensor data from one or more sensors of the mobile device sent at a first predetermined time interval is received from the application at least once during a second predetermined time interval, a length of the second predetermined time interval being tailored to the user of the mobile device;
    if the first sensor data is not received at least once during the second predetermined time interval by the computing device, then transmitting, by the computing device, a notification to the mobile device indicating that the application does not work properly;
    in response to the notification having been transmitted, determining, by the computing device, whether the first sensor data has been received during a third predetermined time interval; and
    if the first sensor data is not received during the third predetermined time interval, updating or adjusting, by the computing device, an amount of an initial discount of an insurance policy of the user.

2. The method of claim 1, wherein determining whether the first sensor data is received from the application at least once during the second predetermined time interval includes determining, by the computing device, the second predetermined time interval based on at least one of a particular time of a day, a particular time of a week, a particular time of a month, a particular time of a year, a driving pattern of the user, or how often the first sensor data was previously received.

3. The method of claim 1, further comprising:
receiving, by the computing device, second sensor data from the application at least once during a fourth predetermined time interval, the fourth predetermined time interval being longer than the second predetermined time interval, wherein the second sensor data is different, at least in part, from the first sensor data.

4. The method of claim 1, wherein the first sensor data includes at least one of accelerometer data, GPS data, gyroscope data, or magnetometer data.

5. The method of claim 1, wherein the first sensor data is collected or generated by the one or more sensors of the mobile device when the mobile device is located in a moving vehicle.

6. The method of claim 1, further comprising in response to the first sensor data being received during the third predetermined time interval, determining that the application is working properly.

7. The method of claim 1, wherein the length of the second predetermined time interval is different from a length of the first predetermined time interval.

8. A computing device for determining a status of an application on a mobile device of a user, the computing device comprising:
a processor; and
a memory having a plurality of instructions stored thereon that, when executed by the processor, causes the computing device to:
in response to the application configured to transmit first sensor data from one or more sensors of the mobile device every first predetermined time interval having been installed on the mobile device, determine whether the first sensor data is received from the application at least once during a second predetermined time interval, a length of the second predetermined time interval being tailored to the user of the mobile device;
in response to the first sensor data being not received at least once during the second predetermined time interval, transmit a notification to the mobile device indicating that the application does not work properly;
in response to the notification having been transmitted, determine whether the first sensor data has been received during a third predetermined time interval; and
in response to the first sensor data not being received during the third predetermined time interval, update or adjust an amount of an initial discount of an insurance policy of the user.

9. The computing device of claim 8, wherein to transmit the first sensor data every first predetermined time interval includes to broadcast, or direct transmission of, by the computing device, the first sensor data every first predetermined time interval.

10. The computing device of claim 8, wherein to determine whether the first sensor data is received from the application at least once during the second predetermined time interval includes to determine the second predetermined time interval based on at least one of a particular time of a day, a particular time of a week, a particular time of a month, a particular time of a year, a driving pattern of the user, or how often the first sensor data was previously received.

11. The computing device of claim 8, wherein the plurality of instructions, when executed, further cause the computing device to:
receive second sensor data from the application at least once during a fourth predetermined time interval, the fourth predetermined time interval being longer than the second predetermined time interval,
wherein the second sensor data is different, at least in part, from the first sensor data.

12. The computing device of claim 8, wherein the first sensor data includes at least one of accelerometer data, GPS data, gyroscope data, or magnetometer data.

13. The computing device of claim 8, wherein the plurality of instructions, when executed, further cause the computing device to respond to the first sensor data being received during the third predetermined time interval by determining that the application is working properly.

14. The computing device of claim 8, wherein the length of the second predetermined time interval is different from a length of the first predetermined time interval.

15. A non-transitory computer-readable medium storing instructions for determining a status of an application on a mobile device of a user, the instructions when executed by one or more processors of a computing device, cause the computing device to:
in response to the application configured to transmit first sensor data from one or more sensors of the mobile device every first predetermined time interval having been installed on the mobile device, determining, by a computing device, whether the first sensor data is received from the application at least once during a second predetermined time interval following the first predetermined time interval, a length of the second predetermined time interval being tailored to the user of the mobile device;
in response to the first sensor data being not received at least once during the second predetermined time interval, transmitting, by the computing device, a notification to the mobile device indicating that the application does not work properly;
in response to the notification having been transmitted, determining, by the computing device, whether the first sensor data has been received during a third predetermined time interval; and
in response to the first sensor data not being received during the third predetermined time interval, updating or adjusting, by the computing device, an amount of an initial discount of an insurance policy of the user.

16. The non-transitory computer-readable medium of claim 15, wherein the instructions that cause the one or more processors to determine whether the first sensor data is received from the application at least once during the second predetermined time interval further comprise instructions that cause the one or more processors to determine the second predetermined time interval based on at least one of a particular time of a day, a particular time of a week, a particular time of a month, a particular time of a year, a driving pattern of the user, or how often the first sensor data was previously received.

17. The non-transitory computer-readable medium of claim 15 wherein the instructions when executed by the one or more processors further cause the computing device to receive second sensor data from the application at least once during a fourth predetermined time interval, the fourth predetermined time interval being longer than the second predetermined time interval, wherein the second sensor data is different, at least in part, from the first sensor data.

18. The non-transitory computer-readable medium of claim 15, wherein the instructions when executed by the one or more processors further cause the computing device to respond to the first sensor data being received during the third predetermined time interval by determining that the application is working properly.

19. The non-transitory computer-readable medium of claim 15, wherein the length of the second predetermined time interval is different from a length of the first predetermined time interval.

20. A computing device for determining a status of an application on a mobile device of a user, the computing device comprising:
   means for processing; and
   memory means for storing a plurality of instructions that, when executed by the means for processing, causes the computing device to:
   in response to the application configured to transmit first sensor data from one or more means for sensing data of the mobile device every first predetermined time interval having been installed on the mobile device, determine whether the first sensor data is received from the application at least once during a second predetermined time interval, a length of the second predetermined time interval being tailored to the user of the mobile device;
   in response to the first sensor data being not received at least once during the second predetermined time interval, transmit via transmission means a notification to the mobile device indicating that the application does not work properly;
   in response to the notification having been transmitted, determine whether the first sensor data has been received during a third predetermined time interval; and
   in response to the first sensor data not being received during the third predetermined time interval, update or adjust an amount of an initial discount of an insurance policy of the user.

* * * * *